Patented Feb. 16, 1943

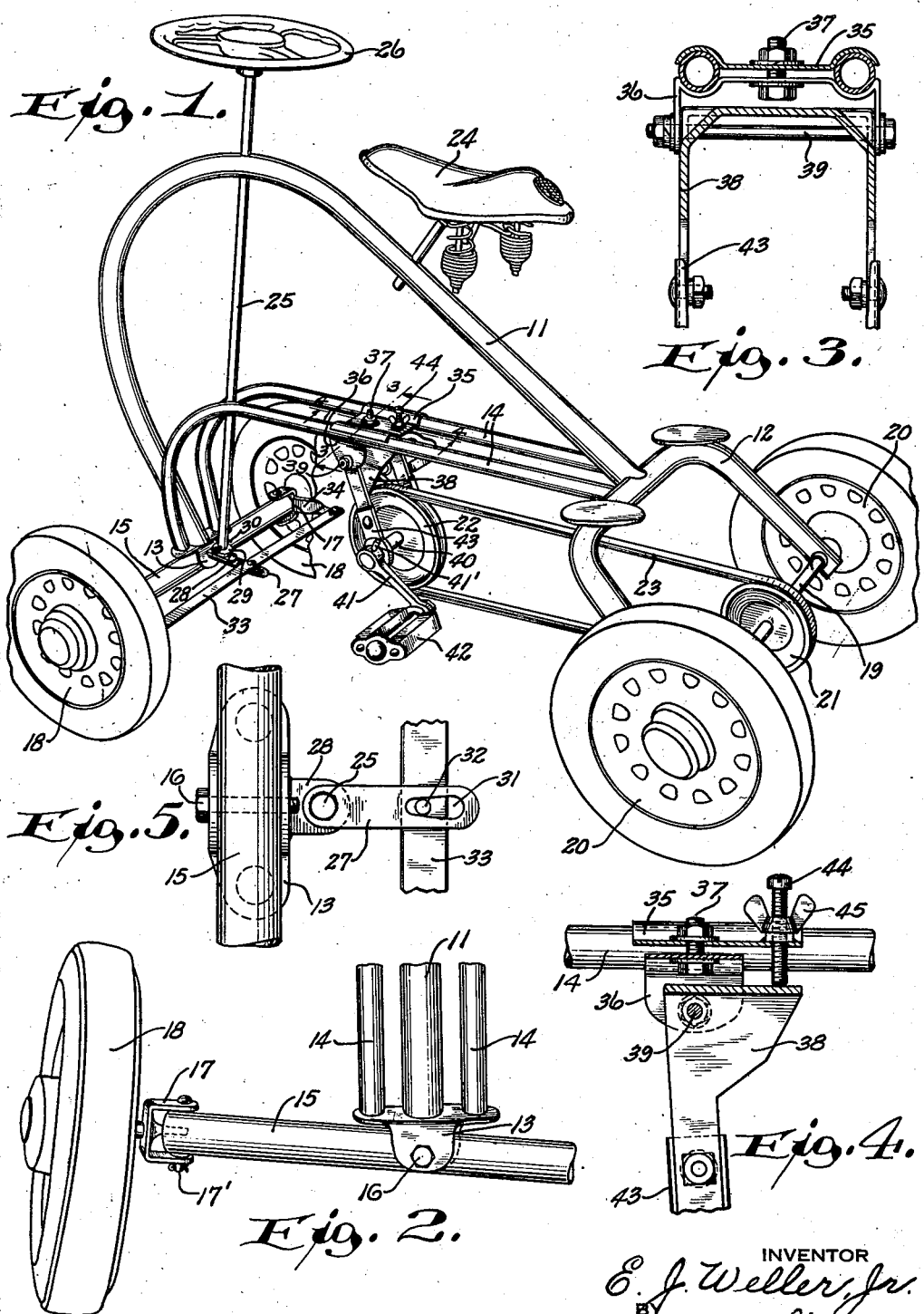

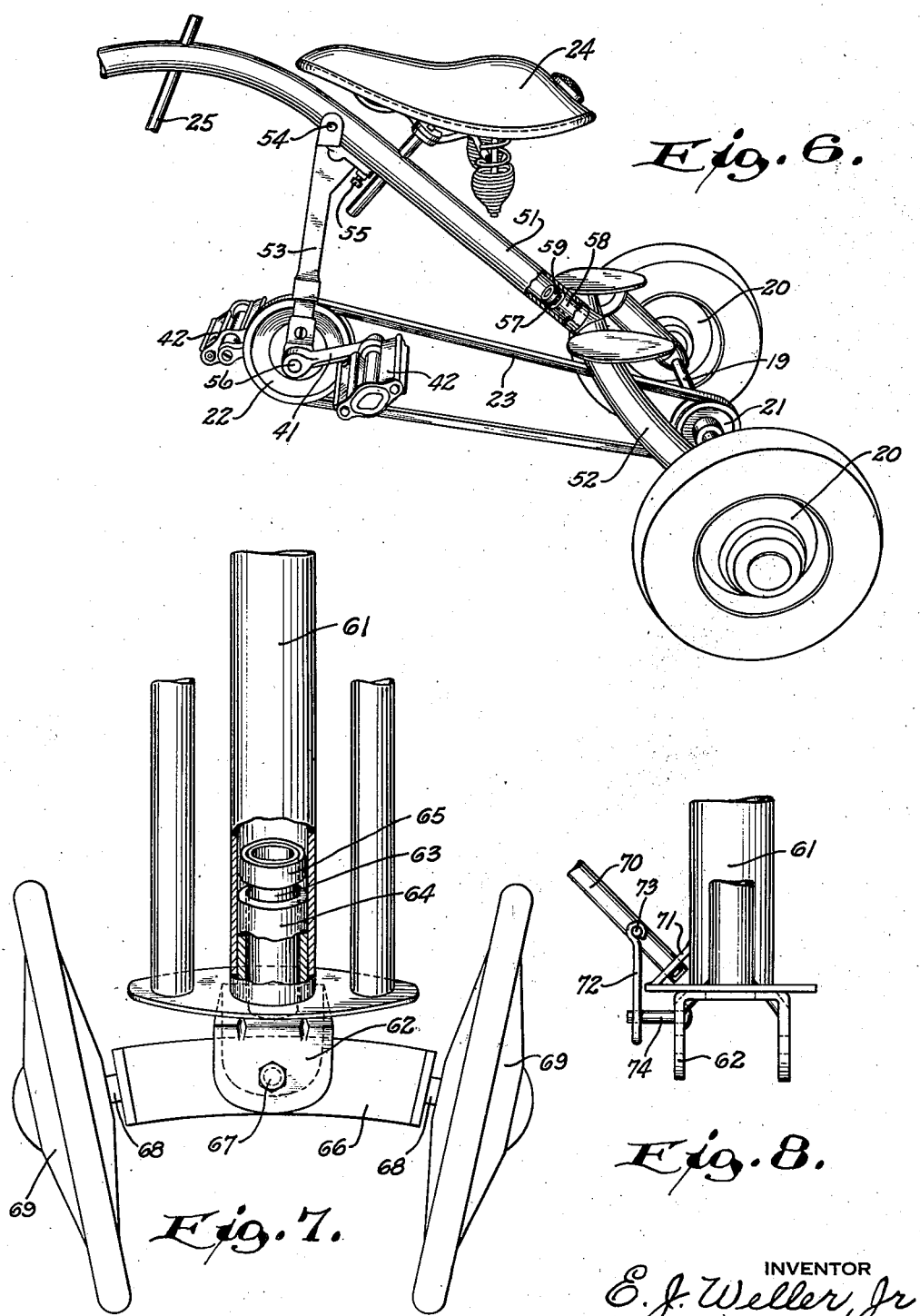

2,311,424

UNITED STATES PATENT OFFICE 2,311,424

VEHICLE

Elyert J. Weiler, Jr., Milwaukee, Wis.

Application January 17, 1941, Serial No. 374,855

15 Claims. (Cl. 280—261)

My present invention relates generally to improvements in the art of vehicular transportation and relates more particularly to improvements in the construction and operation of velocipedes or the like.

Generally defined, an object of my invention is to provide an improved vehicle which is simple and durable in construction and safe in operation.

Many different types of velocipede assemblages have heretofore been provided. Some of these assemblages are of the three-wheeled tricycle type wherein a front steering post carries a rather large wheel which is driven through its axle by means of manually operable foot pedals. Others are of the three-wheeled type which are steered by complicated mechanism associated with the rear wheels of the velocipede. Still others are of the two-wheeled bicycle type likewise steered directly through a front steering column but driven by an endless chain and sprocket arrangement through the rear wheel. There are many modifications and various shapes and styles of the foregoing types of velocipedes, the majority of which are being manufactured with a view toward streamlined appearance and safety, but practically all embodying the same basic principles. The most common velocipede for small children is the tricycle type with the front driving and steering means, but even this comparatively safe toy has various objectionable features. Because of the ordinarily rigid three point suspension and base contact and the comparatively short turning radius afforded by the direct steering column, the center of gravity in this type of velocipede is quite high and the velocipede may be upset rather easily, especially in making turns or in riding on bumpy or uneven ground. This velocipede is also rather difficult for a child to propel because of the direct pedal drive which is especially hazardous when pedaling while making a turn. The rear wheel steering arrangement was developed to overcome the foregoing objections to the tricycle, but this velocipede resulted in an even more unstable and top-heavy structure because a far greater amount of strain is thrown on the single front wheel when the rear wheels are turned. The two-wheeled structure is obviously only suitable for older children because of the keen sense of balance necessary to maintain the bicycle in upright position. The center of gravity is naturally exceedingly high in the bicycle, and the foregoing objections are further emphasized. The chain and sprocket driving mechanism is also objectionable in that the loose bottoms of slacks and trouser legs are frequently caught therein, often resulting in upsetting the rider and tearing of clothes.

It is therefore a more specific object of my present invention to provide a new type of improved velocipede wherein the center of gravity is relatively low at all times, which can be readily manipulated and steered by a small child with minimum possibility of tipping, and which is driven through the rear wheels with maximum safety and efficiency.

Another specific object of the invention is to provide an improved highly efficient and extremely sturdy steering mechanism for a four-wheeled velocipede, which is adapted to cooperate indirectly with the front wheels for turning the same simultaneously.

Another specific object of my invention is to provide a simple but highly efficient adjustable driving mechanism for a velocipede, which is adapted to cooperate with the rear wheels by a belt and sheave assemblage to propel the velocipede.

Still another object of the invention is to provide a velocipede which may be universally adjusted to accommodate children of various sizes, and to meet various operating conditions.

A further specific object of the present invention is to provide an improved velocipede of sturdy construction and having extremely attractive streamlined appearance, and in which the several parts are flexibly mounted to reduce the stress and strain thereon in traveling over uneven ground.

An additional object of the invention is to provide a durable and easily controllable velocipede having the flexibility and other advantages of a three point frame suspension as well as the stability of a four point contact base, and which may nevertheless be readily manufactured.

Another object of my invention is to provide a sturdy and safe velocipede assemblage, which can be manufactured and sold at moderate cost, and which may be produced in various attractive forms.

These and other specific objects and advantages will be apparent from the following detailed description.

A clear conception of the several features constituting my present improvement, and of the mode of constructing and operating velocipedes built in accordance with the invention, may be had by referring to the drawings accompanying and forming a part of this specification wherein like reference characters designate the same or similar parts in the several views.

Fig. 1 is a perspective view of the velocipede assemblage, parts being broken away for the sake of clearness;

Fig. 2 is a perspective view of a fragment of the front axle and frame of the velocipede, showing the axle in tilted position with respect to the frame;

Fig. 3 is an enlarged transverse vertical section through the sheave and pedal suspension assemblage, taken along the line 3—3 of Fig. 1;

Fig. 4 is a likewise enlarged longitudinal vertical section through the sheave and pedal suspension assemblage, taken along the line 4—4 of Fig. 1;

Fig. 5 is a similarly enlarged bottom view of a fragment of the front axle showing a portion of the steering mechanism as applied thereto;

Fig. 6 is a perspective view of a fragment of a modified type of velocipede, a portion being broken away to more clearly disclose working parts;

Fig. 7 is a perspective view of a fragment of a modified type of front axle and suspension, a portion being broken away to disclose working parts; and Fig. 8 is a side elevation of a fragment of a modified steering mechanism.

While the invention has been shown herein as being specifically applied to a vehicle of the velocipede type, it is not desired to unnecessarily restrict the scope by such specific embodiment.

Referring to the drawings and more particularly to Figs. 1 to 5, inclusive, the improved vehicle comprises in general a frame consisting of a single piece of tubing 11 having a rear fork or transverse member 12 and a front gooseneck portion carrying a bracket 13 at its lower extremity, a pair of spaced parallel rods or elongated elements 14 extending longitudinally of said frame and rigidly attached by welding or the like at the front ends to the side portions of said bracket 13 and at their rear ends to said fork member 12, a tubular member 15 pivotally carried by the bracket 13 by means of a pivot bolt 16 piercing the ears of said bracket and the central portion of said member 15, stub axles 17 swingably mounted on the opposite ends of said transverse member 15 by means of pins 17' and carrying front wheels 18, a rear driving axle 19 piercing the lower ends of the arms of the rear member 12 and having rear drive wheels 20 rigidly attached to its opposite ends and a sheave 21 rigidly attached to the medial portion thereof, driving mechanism comprising a pedal driven sheave 22 adjustable along the frame elements 14 and adapted to cooperate with the sheave 21 by means of a rubber V-belt 23, an adjustable saddle seat 24 carried by the tubular frame 11 intermediate the fork member 12 and gooseneck portion, and a steering column 25 piercing and journalled in the frame tubing 11 at the upper portion of the gooseneck and being provided with a steering wheel 26 at its upper extremity while the lower extremity cooperates with steering mechanism associated with the front wheels 18.

Referring specifically to Figs. 1 and 5, the steering mechanism comprises a lever or arm 27 welded or otherwise rigidly attached to the extreme lower end of the steering column 25 which is journalled in a supporting ear 28 rigidly connected to a depending ear of the bracket 13, and the lever 27 is held in close contact with the ear 28 by means of a washer 29 and a cotter pin 30 piercing the column 25 immediately above the washer 29 and ear 28. The lever 27 is provided with a dove-tailed slot 31 in which a lug 32 rigidly secured to the central portion of a connecting link 33 is adapted to ride. The link 33 is pivotally connected at opposite ends to arms 34 of the stub axles 17 thus forming a parallelogram consisting of the member 15, link 33 and arms 34. The slot 31 is preferably formed of greater width at the rear portion to prevent binding of the lug 32 when the wheels are turned and the member 15 is in tilted position with respect to the frame member 11 as shown in Fig. 2. While the lever 27 is shown as being attached to the extreme lower end of the steering column 25, it may of course be attached to the column higher up with the bearing ear 28 positioned therebelow.

Referring to Figs. 1, 3, and 4, the driving mechanism comprises a clamping plate 35 formed to hook over the members 14, a suspension bracket 36 likewise formed for engagement with the members 14 and held in clamping engagement therewith by means of a clamping bolt assemblage 37 coacting with the medial portions of the plate 35 and bracket 36, an adjustable suspension saddle 38 swingably suspended from the arms of the bracket 36 by means of a pivot bolt 39, and a sheave 22 having a driving shaft 40 provided with crank arms 41 carrying pedals 42 and the shaft 40 being journalled in arms 43 attached to the sides of the saddle 38. The saddle 38 may be adjusted to various positions about the pivot bolt 39 by means of an adjustable set screw 44 and wing nut 45 carried by the plate 35 and cooperating with the saddle 38 remote from the pivot pin 39, see Fig. 4. A rubber V-belt 23 cooperates with the pedal driven sheave 22 and with the sheave 21 to transmit rotary motion to the rear axle 19 and wheels 20.

The velocipede may be readily adjusted for children of various sizes by setting the saddle seat at the desired height and clamping it to the frame member 11 in a well known manner, adjusting the plate 35 and bracket 36 at the desired position along the frame members 14 and clamping them firmly together by means of the bolt assemblage 37, positioning a rubber V-belt of the proper length about the sheave 22 after having likewise positioned it about the sheave 21 before putting the axle 19 in place, journalling the shaft 40 in the arms 43 which are then attached to the saddle 38, and rigidly securing the crank arms 41 to the shaft 40. The slack of the belt 23 may then be taken up by adjusting the set screw 44 and wing nut 45 until the proper tension is obtained. The sheave 22 may also be removed from its suspension bracket for belt replacement by removing the pins 41' from the cranks 41 thereby loosening the cranks from the shaft 40 and enabling removal of the shaft from the arms 43.

During operation, the rear wheels 20 are rotated simultaneously with the rear axle 19 to propel the vehicle when the sheave 21 is revolved by the belt 23 which receives its motion from the sheave 22 through the driving shaft 40, cranks 41 and pedals 42. The vehicle may be steered through the steering column 25 by turning the steering wheel 26 thus causing the lever 27 to oscillate. This oscillation is transmitted through the lug 32 to the link 33 and causes this link to move longitudinally and thereby likewise oscillate the arms 34, stub axles 17 and front wheels 18. As already indicated, the member 15 carrying the stub axles 17 is pivotally suspended at its medial portion from the bracket 13 of the frame member 10 to absorb shock and maintain the main vehicle frame in upright position when it is being transported over uneven ground, and it is therefore desirable to provide the slot 31 of dove-tailed shape in the lever 27 to insure free riding of the lug 32 in the slot when the member 15 is tilted with respect to the frame and when the wheels 18 are turned.

Referring specifically to Fig. 6 wherein a modified type of vehicle is shown, the assemblage comprises in general a tubular frame member 51 having a rear forked member 52 pivotally mounted thereon, a rear axle 19 journalled in the lower portions of the fork prongs and provided with driving wheels 20 at its opposite ends and having a sheave 21 secured to its medial portion, a driving sheave 22 suspended from the frame member 51 and operated by cranks 41 and pedals 42, a rubber V-belt 23 cooperating with the sheaves 21 and 22, a saddle seat 24 mounted on the frame member 51 ahead of the fork 52, and a steering column 25 piercing and journalled in the frame member 51 in front of the seat 24. The sheave 22 is suspended from the frame 51 by means of a suspension and adjusting arm 53 provided with upper and lower forked ends. The upper forked end is swingably suspended from the frame member 51 by means of a pivot pin 54 and the arm 53 may be adjusted to various positions to properly tension the V-belt 23 by manipulation of the adjustable set screw 55. The lower forked end of the arm 53 carries the sheave 22 by its driving shaft 56 which is driven by cranks 41 and pedals 42 rigidly mounted thereon.

The rear forked member 52 may be mounted on the tubular frame 51 by means of a pivot sleeve 57 rigidly secured to the medial upper portion of the fork 52, and a swivel sleeve 58 adapted to fit loosely about the pivot sleeve 57 and held in place thereon by a collar 59 rigidly attached to the pivot sleeve 57 and forming a head therefor. The collar 59 should be of less diameter than the swivel sleeve 58 which is press-fitted into the tubular frame member 51 thereby providing a swingable mounting.

The operation of this modified type of velocipede is practically identical with the operation of the preferred type already described, but the suspension means for the sheave 22 and its driving members, as shown in Fig. 6, may be more practical for small velocipede units than that shown in Figs. 1, 3, and 4 which is perhaps a more sturdy and desirable construction for larger units. The flexible mounting for the rear forked member shown in Fig. 6 serves the same purpose as the flexible mounting for the front transverse member 15 shown in Figs. 1 and 2 and either one or the other of these mountings may be used depending on whether it is desired to have a front or rear flexible mounting.

Referring to Figs. 7 and 8 which illustrate a modified type of steering assemblage, the structure comprises a tubular frame member 61 swingably supported upon a bracket 62 by means of a centrally disposed pivot sleeve 63 rigidly secured to the bracket 62 and having swivel coaction with a swivel sleeve 64 press-fitted into the tubular frame 61. The upper end of the pivot sleeve 63 has a collar 65 rigidly attached thereto and forming a head which prevents separation of the sleeves 63, 64, and a front transverse member 66 is pivotally suspended at its medial portion from the bracket 62 by means of a pivot pin 67 and is provided with stub axles 68 carrying wheels 69. A steering column 70 is journalled at its lower portion in a supporting bracket 71, and a V-shaped sling 72 pivotally suspended from the column 70 by means of a pin 73, coacts with a rearwardly projecting pin 74 on the bracket 62, so that oscillation of the column 70 will cause the bracket 62 and the member 66 to simultaneously oscillate. In order to provide sufficient clearance and to prevent binding of parts due to the inclination of the column 70, the sling 72 should be pivotally suspended and should also extend considerably below the pin 74. This modified construction may be applied to the vehicle shown in Figs. 1 to 5, inclusive, as well as to the vehicle shown in Fig. 6 when the rear forked member 52 is rigidly mounted upon the frame member 51. In operation, the steering column 70 may be turned to swing the sling 72 thereabout and to rotate the bracket 62, member 66, and wheels 69 about the frame member 61, in an obvious manner.

From the foregoing specific description, it will be noted that a highly attractive, sturdily constructed and universally adjustable vehicle is provided which is extremely safe in operation. The three point suspension with the additional advantages of a four point contact base insures a relatively low center of gravity and the flexible mounting of either the front or rear axles and wheels provides a shock absorber and maintains stability when operated over uneven ground. The provision of a rubber V-belt is highly desirable because it may be readily replaced at low cost and is extremely safe. The V-belt is also silent in operation, requires no lubrication, and absorbs shock, thereby insuring smooth driving. The V-belt may also be quickly and effectively adjusted in order to properly tension the same, and may be replaced at minimum cost because these belts are of standard construction. The improved vehicle is moreover extremely sturdy and durable, and has proven highly successful in actual use.

It should be understood that it is not desired to limit this invention to the exact details of construction or to the precise mode of operation, herein shown and described, for various modifications within the scope of the claims may occur to persons skilled in the art.

I claim:

1. In a vehicle, a frame comprising a single piece of tubing bent to inverted U-shape, a transverse axle supporting member associated with each of the lower ends of said tubing, a supporting wheel associated with each end of each of said members, one of said members having a swivel connection with the adjacent end of said tubing and the other of said members being rigidly attached to the other end of the tubing, and a steering column journalled in the medial upper portion of said tubing and co-operating with one set of said wheels to guide the vehicle.

2. In a vehicle, a frame comprising a single piece of tubing bent to inverted U-shape, a transverse axle supporting member associated with each of the lower ends of said tubing, a supporting wheel associated with each end of each of said members, one of said members having a swivel connection with the adjacent end of said tubing and the other of said members being rigidly attached to the other end of the tubing, and pedal mechanism suspended beneath the medial portion of said tubing and cooperating with one set of said wheels to drive the vehicle.

3. In a vehicle, a frame comprising a single piece of tubing bent to inverted U-shape, a transverse axle supporting member associated with each of the lower ends of said tubing, a supporting wheel associated with each end of each of said members, one of said members having a swivel connection with the adjacent end of said tubing and the other of said members being rigidly attached to the other end of the tubing, a steering column journalled in the medial upper portion of said tubing and co-operating with one set of said wheels to guide the vehicle, and pedal mechanism suspended beneath the medial portion of said tubing and co-operating with the other set of wheels to drive the vehicle.

4. In a vehicle, a frame comprising a single piece of tubing bent to inverted U-shape, a transverse axle supporting member associated with each of the lower ends of said tubing, one of said members being straight and the other being of inverted U-shape and each of said members having its mid-portion attached to the adjacent end of said tubing, a supporting wheel journalled at each end of each of said members, a swivel connection interposed between one of said members and the adjacent end of said tubing, and a steering column journalled in the medial upper portion of said tubing and co-operating with one set of said wheels to guide the vehicle.

5. In a vehicle, a frame comprising a single piece of tubing bent to inverted U-shape, a transverse axle supporting member associated with each of the lower ends of said tubing, one of said members being straight and the other being of inverted U-shape and each of said members having its mid-portion attached to the adjacent end of said tubing, a supporting wheel journalled at each end of each of said members, a swivel connection interposed between one of said members and the adjacent end of said tubing, and pedal mechanism suspended beneath the medial portion of said tubing and co-operating with one set of said wheels to drive the vehicle.

6. In a vehicle, a frame comprising a single piece of tubing bent to inverted U-shape, a transverse axle supporting member associated with each of the lower ends of said tubing, one of said members being straight and the other being of inverted U-shape and each of said members having its mid-portion attached to the adjacent end of said tubing, a supporting wheel journalled at each end of each of said members, a swivel connection interposed between one of said members and the adjacent end of said tubing, a steering column journalled in the medial upper portion of said tubing and co-operating with one set of said wheels to guide the vehicle, and pedal mechanism suspended beneath the medial portion of said tubing and co-operating with the other set of wheels to drive the vehicle.

7. In a vehicle, a frame comprising a single piece of tubing bent to inverted U-shape, a transverse axle supporting member coacting with each of the lower ends of said tubing, a supporting wheel journalled at each end of each of said members, one of said members being of inverted U-shape and having its medial portion connected by a swivel to the adjacent end of said tubing, and a steering column piercing the medial upper portion of said tubing and co-operating with the wheels associated with the other of said members to guide the vehicle.

8. In a vehicle, a frame comprising a single piece of tubing bent to inverted U-shape, a transverse axle supporting member coacting with each of the lower ends of said tubing, a supporting wheel journalled at each end of each of said members, one of said members being straight and having its medial portion connected by a swivel to the adjacent end of said tubing, and a steering column piercing the medial upper portion of said tubing and co-operating with the wheels associated with said swivelled member to guide the vehicle.

9. In a vehicle, a frame comprising a single piece of tubing bent to inverted U-shape, a transverse axle supported member coacting with each of the lower ends of said tubing, a supporting wheel journalled adjacent to each end of each of said members, and a pair of approximately horizontal elongated elements rigidly interconnecting the opposite lower ends of said tubing near the medial portions of said members.

10. In a vehicle, a frame comprising a single piece of tubing bent to inverted U-shape, a transverse axle supported member coacting with each of the lower ends of said tubing, a supporting wheel journalled adjacent to each end of each of said members, a pair of approximately horizontal elongated elements rigidly interconnecting the opposite lower ends of said tubing near the medial portions of said members, and a steering column piercing the medial upper portion of said tubing and co-operating with one of said members between said elements to move the wheels carried by said member to guide the vehicle.

11. In a vehicle, a frame comprising a single piece of tubing bent to inverted U-shape, a transverse axle supported member associated with each of the lower ends of said tubing, a supporting wheel associated with each end of each of said members, the lower front end of said tubing being directed rearwardly and disposed beneath the upper medial portion of the latter and the rear supporting member being of inverted U-shape and having its medial upper portion connected to the lower rear end of said tubing, and a pair of approximately horizontal elongated elements rigidly interconnecting the front and rear lower ends of said tubing near the medial portions of said members.

12. In a vehicle, a frame comprising a single piece of tubing bent to inverted U-shape, the front and rear lower ends of said tubing being rearwardly directed, a pair of approximately horizontal and parallel elongated elements rigidly interconnecting said lower tubing ends, a transverse axle supported member associated with each of said tubing ends, one of said members being rigidly connected to the adjacent ends of said tubing and of said elements, and supporting wheels associated with said members.

13. In a vehicle, a frame comprising a single piece of tubing bent to inverted U-shape, the front and rear lower ends of said tubing being rearwardly directed, a pair of approximately horizontal and parallel elongated elements rigidly interconnecting said lower tubing ends, a transverse axle supported member associated with each of said tubing ends, one of said members being of inverted U-shape and having its medial upper portion rigidly connected to the adjacent rear ends of said tubing and of said elements, and a supporting wheel associated with each of the opposite ends of each of said members.

14. In a vehicle, a frame comprising a single piece of tubing bent to inverted U-shape, the front and rear lower ends of said tubing being rearwardly directed, a pair of approximately horizontal and parallel elongated elements rigidly interconnecting said lower tubing ends, a transverse axle supported member associated with each of said tubing ends, one of said members being rigidly connected to the adjacent ends of said tubing and of said elements, supporting wheels associated with said members, and a steering column piercing the medial upper portion of said tubing and extending downwardly between said elements to a point near the lower front end of the tubing.

15. In a vehicle, a frame comprising a single piece of tubing bent to inverted U-shape, the front and rear lower ends of said tubing being rearwardly directed, a pair of approximately horizontal and parallel elongated elements rigidly interconnecting said lower tubing ends, a transverse axle supported member associated with each of said tubing ends, one of said members being of inverted U-shape and having its medial upper portion rigidly connected to the adjacent rear ends of said tubing and of said elements, a supporting wheel associated with each of the opposite ends of each of said members, and a steering column piercing and journalled for rotation in the upper medial portion of said tubing and extending downwardly between said elements to a point near the medial portion of the front axle member.

ELYERT J. WELLER, Jr.